(12) United States Patent
Gomi et al.

(10) Patent No.: US 7,800,674 B2
(45) Date of Patent: Sep. 21, 2010

(54) SOLID-STATE IMAGE SENSING APPARATUS AND METHOD OF READING IMAGE SIGNAL USING A PLURALITY OF OUTPUT CHANNELS

(75) Inventors: Yuichi Gomi, Hachioji (JP); Seisuke Matsuda, Hachioji (JP); Yukihiro Kuroda, Hachioji (JP); Keiichi Mori, Hachioji (JP)

(73) Assignee: Olympus Corporation, Tokyo (JP)

( * ) Notice: Subject to any disclaimer, the term of this patent is extended or adjusted under 35 U.S.C. 154(b) by 1176 days.

(21) Appl. No.: 10/808,688

(22) Filed: Mar. 25, 2004

(65) Prior Publication Data

US 2005/0068440 A1 Mar. 31, 2005

(30) Foreign Application Priority Data

Apr. 2, 2003 (JP) ............................. 2003-099509

(51) Int. Cl.
*H04N 5/335* (2006.01)
(52) U.S. Cl. ...................................................... 348/308
(58) Field of Classification Search ................ 348/302, 348/303, 308, 294, 362, 272
See application file for complete search history.

(56) References Cited

U.S. PATENT DOCUMENTS

| | | | | |
|---|---|---|---|---|
| 4,816,910 A | * | 3/1989 | Hashimoto et al. ........... | 348/247 |
| 4,827,345 A | * | 5/1989 | Nakagawa et al. ........... | 358/482 |
| 4,887,160 A | * | 12/1989 | Kinoshita et al. ........... | 348/237 |
| 5,150,204 A | * | 9/1992 | Yamazaki .................... | 348/234 |
| 6,466,265 B1 | * | 10/2002 | Lee et al. ..................... | 348/308 |
| 6,496,286 B1 | * | 12/2002 | Yamazaki .................... | 358/514 |
| 6,512,546 B1 | | 1/2003 | Decker et al. | |
| 6,822,211 B2 | * | 11/2004 | Hagihara ................. | 250/208.1 |
| 6,952,228 B2 | * | 10/2005 | Yoneda et al. .............. | 348/308 |
| 7,012,635 B2 | * | 3/2006 | Umeda et al. ............ | 348/208.4 |
| 7,106,372 B1 | * | 9/2006 | Bell et al. .................... | 348/308 |
| 7,106,374 B1 | * | 9/2006 | Bandera et al. ............. | 348/308 |
| 7,129,979 B1 | * | 10/2006 | Lee ............................. | 348/308 |
| 7,138,617 B2 | * | 11/2006 | Mabuchi .................. | 250/208.1 |
| 7,139,026 B2 | * | 11/2006 | Hara et al. ................... | 348/308 |

(Continued)

FOREIGN PATENT DOCUMENTS

JP 62-281574 12/1987

(Continued)

OTHER PUBLICATIONS

"8M-pixel Color Image Sensor" Amtel Corporation 2003.

(Continued)

*Primary Examiner*—John M Villecco
*Assistant Examiner*—Kent Wang
(74) *Attorney, Agent, or Firm*—Straub & Pokotylo; John C. Pokotylo

(57) ABSTRACT

A solid-state image sensing apparatus having output channels CH1 and CH2 has first and second driving modes in which pixel signals of pixels in the same image sensing area are read out. The number of output channels to be used is changed between the first driving mode and the second driving mode. In at least one of the two modes, the phase of the read timing of pixel signals of pixels adjacent in the horizontal direction is shifted by a predetermined amount.

7 Claims, 8 Drawing Sheets

U.S. PATENT DOCUMENTS

| | | | |
|---|---|---|---|
| 7,292,276 B2 * | 11/2007 | Egawa et al. | 348/308 |
| 7,298,403 B2 * | 11/2007 | Tamagawa | 348/245 |
| 2002/0067416 A1 * | 6/2002 | Yoneda et al. | 348/304 |
| 2002/0154231 A1 * | 10/2002 | Decker et al. | 348/302 |
| 2002/0167601 A1 * | 11/2002 | Ohzu et al. | 348/243 |
| 2003/0086005 A1 * | 5/2003 | Nakamura | 348/223.1 |
| 2003/0193585 A1 * | 10/2003 | Ogura et al. | 348/272 |

FOREIGN PATENT DOCUMENTS

| | | |
|---|---|---|
| JP | 01-190179 | 7/1989 |
| JP | 4-23577 | 1/1992 |
| JP | 8-182005 | 7/1996 |
| JP | 9-4680 | 1/1997 |
| JP | 2000-12819 | 1/2000 |
| JP | 2000-32344 | 1/2000 |
| JP | 2000-164845 | 6/2000 |
| JP | 2000-312312 | 11/2000 |
| JP | 2001-16502 | 1/2001 |
| JP | 2001-78095 | 3/2001 |

OTHER PUBLICATIONS

Notification of Reasons for Rejection for Japanese Patent Application No. 2003-099509, mailed Mar. 17, 2009 (3 pgs.) with translation (3 pgs.).

Notice of Reasons for Rejection for Japanese Patent Application No. 2003-099509, mailed Feb. 23, 2010 (3 pgs.) with translation (4 pgs.).

* cited by examiner

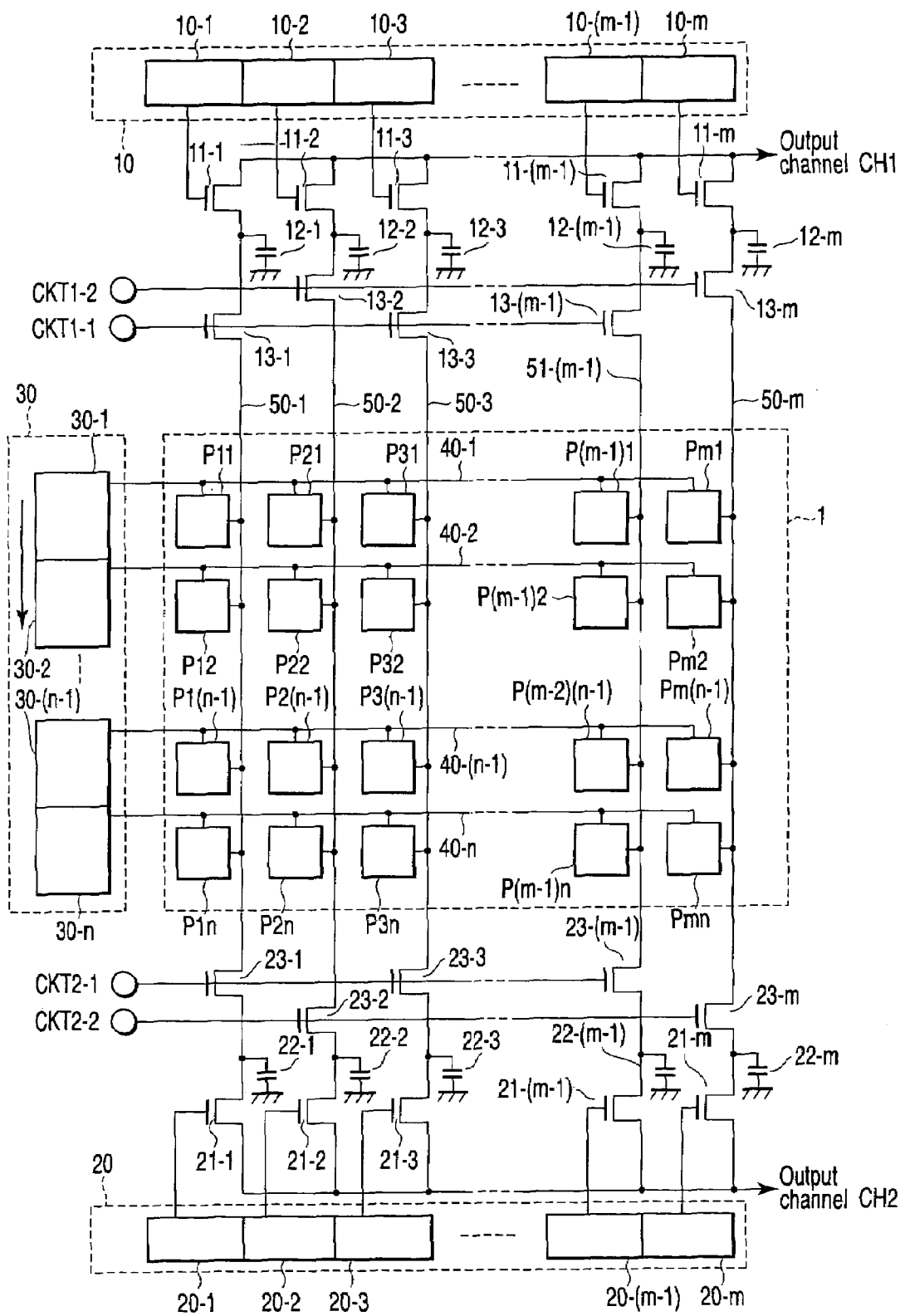
F I G. 1

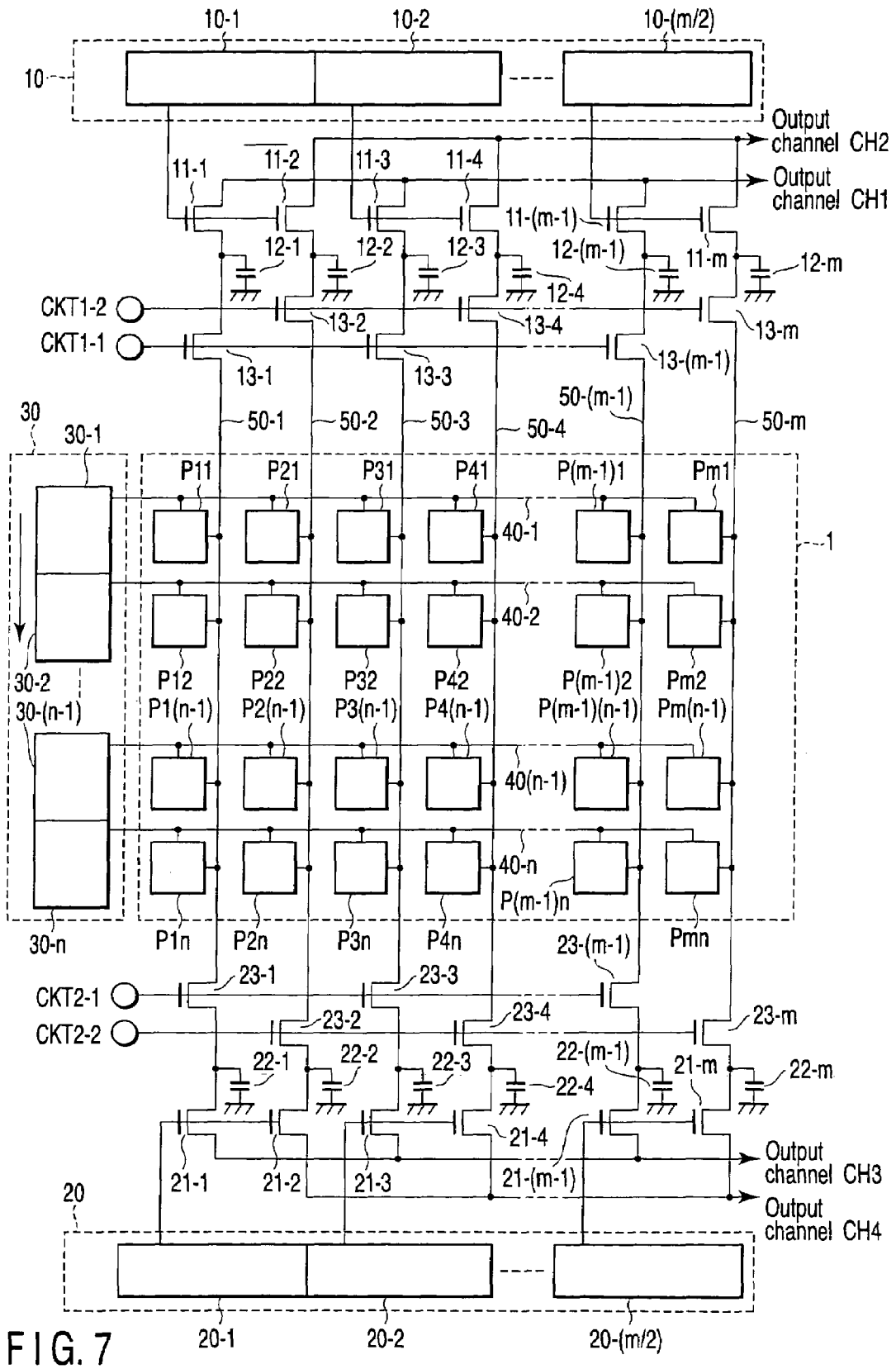
F I G. 7

SOLID-STATE IMAGE SENSING APPARATUS AND METHOD OF READING IMAGE SIGNAL USING A PLURALITY OF OUTPUT CHANNELS

CROSS-REFERENCE TO RELATED APPLICATIONS

This application is based upon and claims the benefit of priority from the prior Japanese Patent Application No. 2003-099509, filed Apr. 2, 2003, the entire contents of which are incorporated herein by reference.

BACKGROUND OF THE INVENTION

1. Field of the Invention

The present invention relates to a solid-state image sensing apparatus having two-dimensionally arrayed pixels and, more particularly, to a solid-state image sensing apparatus having a plurality of output channels and a reading method thereof.

2. Description of the Related Art

Conventionally, in an image sensing apparatus using a solid-state image sensing element, the speed of image data reading from the solid-state image sensing element must be increased as the number of pixels increases. However, the driving frequency of a solid-state image sensing apparatus cannot be raised indiscriminately because it has an upper limit (e.g., 20 to 30 MHz) based on the semiconductor manufacturing process or design rule.

There are various known techniques dealing with this restriction, i.e., techniques for reading out image signals in parallel by increasing the number of signal output lines.

According to one of the techniques, pixel signals of the same color are added on an output line, and a sum signal of a plurality of pixels are output from a plurality of output terminals (Jpn. Pat. Appln. KOKAI Publication No. 8-182005).

In another technique, a column read is employed to read out pixels corresponding to color filters. When image data are read out while shifting the pixels of the second or fourth row by one column, outputs of the same color can always be obtained from four output terminals (Jpn. Pat. Appln. KOKAI Publication No. 9-4680).

There is still another technique using a parallel output structure. Signals of specific pixels arrayed in a matrix are output from one of two horizontal signal lines (Jpn. Pat. Appln. KOKAI Publication No. 2000-12819).

Alternatively, a plurality of output circuits are arranged in correspondence with divided regions of a pixel array so that a plurality of pixels are simultaneously read out as addresses (Jpn. Pat. Appln. KOKAI Publication No. 2000-32344).

Furthermore, various proposals have been made for an image sensor having a parallel output structure (U.S. Pat. No. 6,512,546 and "8M color imager with two output registers and four outputs").

However, the prior art described above is not always optimized for various kinds of aspects including moving image sensing, automatic exposure (AE) control, automatic white balance (AWB) control and automatic focusing (AF) control.

BRIEF SUMMARY OF THE INVENTION

It is an object of the present invention to provide a solid-state image sensing apparatus which has a plurality of output channels to output image data in parallel so that a high-speed pixel read can be executed, and a reading method thereof.

In order to achieve the above object, in a solid-state image sensing apparatus having a plurality of output channels, a first driving mode and a second driving mode in which pixel signals of pixels in the same image sensing area are read out can freely be set, and control is executed to change the number of output channels to be used between the first driving mode and the second driving mode.

Advantages of the invention will be set forth in the description which follows, and in part will be obvious from the description, or may be learned by practice of the invention. Advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate embodiments of the invention, and together with the general description given above and the detailed description of the embodiments given below, serve to explain the principles of the invention.

FIG. 1 is a circuit diagram showing the arrangement of a solid-state image sensing apparatus according to a first embodiment of the present invention;

FIG. 7 is a circuit diagram showing the arrangement of a solid-state image sensing apparatus according to a second embodiment of the present invention;

DETAILED DESCRIPTION OF THE INVENTION

Figure 2:
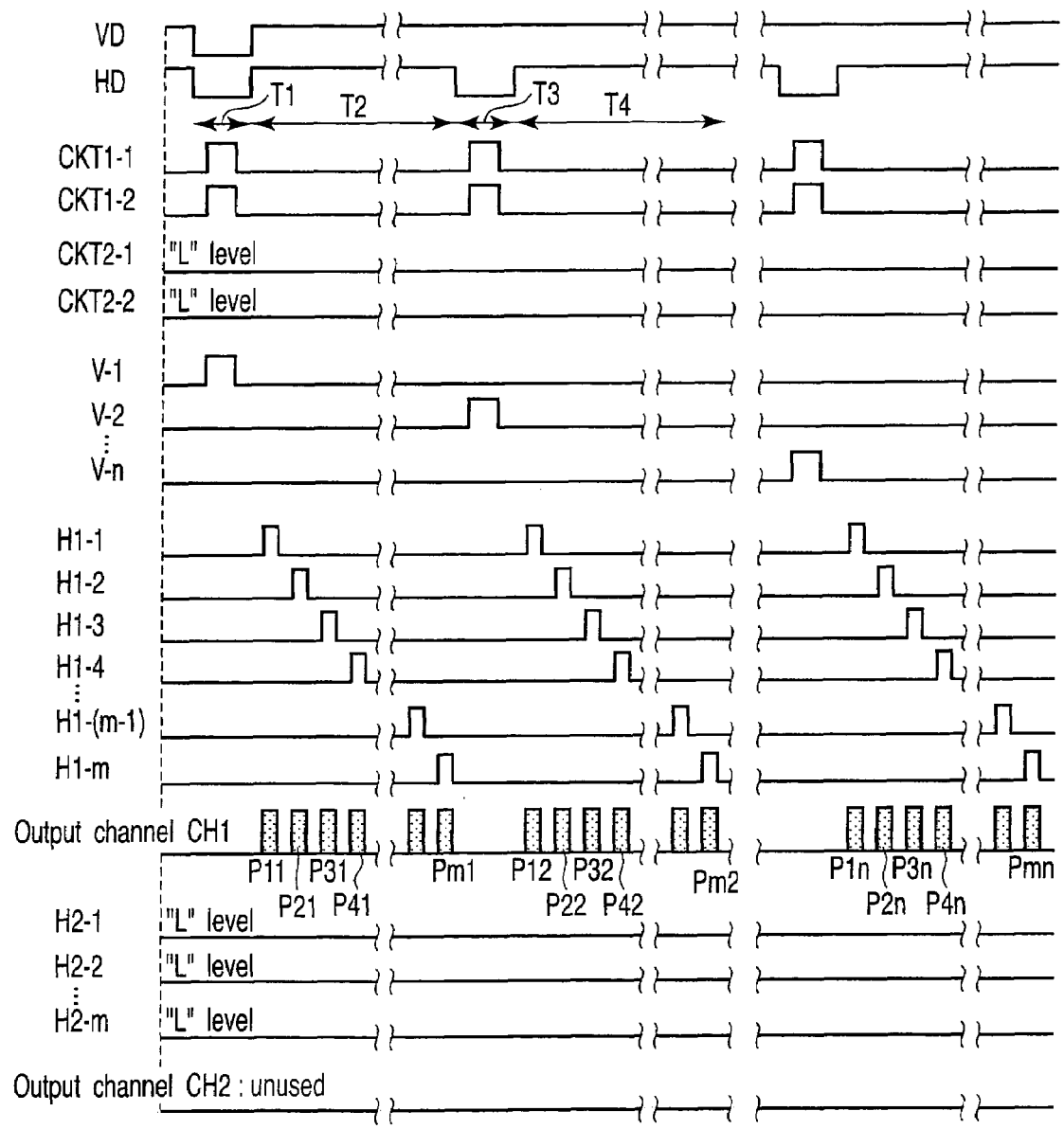
FIG. 2 is a timing chart showing the operation in the first driving mode by a solid-state image sensing element according to the first embodiment of the present invention.

The embodiments of the present invention will be described below with reference to the accompanying drawing.

First Embodiment

FIG. 1 shows the arrangement of a solid-state image sensing apparatus according to a first embodiment of the present invention. This will be described in detail. Referring to FIG. 1, reference symbols P11 to Pmn ($\underline{m}$ and $\underline{n}$ are integers) denote m×n pixels which are two-dimensionally arrayed in a matrix. Reference numeral 1 denotes a solid-state image sensing element (area sensor) including the plurality of pixels.

Reference numeral 30 denotes a vertical scanning circuit. The vertical scanning circuit 30 sequentially scans lines 40-1 to 40-n. The vertical scanning circuit 30 includes a plurality of units 30-1 to 30-n corresponding to the lines 40-1 to 40-n.

Reference numerals 10 and 20 denote horizontal scanning circuits. The horizontal scanning circuits 10 and 20 sequentially read out horizontally electrical signals delivered from the pixels P11 to Pmn to output signal lines 50-1 to 50-m for the respective pixels.

The horizontal scanning circuit 10 includes a plurality of units 10-1 to 10-m corresponding to the output signal lines 50-1 to 50-m. The horizontal scanning circuit 20 includes units 20-1 to 20-m corresponding to the output signal lines 50-1 to 50-m.

Lines (not shown) other than the lines 40-1 to 40-n and output signal lines 50-1 to 50-m are also connected to the pixels P11 to Pmn.

Each of the output signal lines 50-1 to 50-m has, at one end on the side of the horizontal scanning circuit 10, a set of a corresponding one of transistors 13-1 to 13-m, a corresponding one of line memories 12-1 to 12-m, and a corresponding one of transistors 11-1 to 11-m, as shown in FIG. 1.

On the other hand, each of the output signal lines 50-1 to 50-m has, at the other end on the side of the horizontal scanning circuit 20, a set of a corresponding one of transistors 23-1 to 23-m, a corresponding one of line memories 22-1 to 22-m, and a corresponding one of transistors 21-1 to 21-m, as shown in FIG. 1.

The transistors 13-1 to 13-m and 23-1 to 23-m function as transfer switches to transfer signals of pixel rows selected by the vertical scanning circuit 30 to the line memories 12-1 to 12-m and 22-1 to 22-m. The transistors 13-1 to 13-m and 23-1 to 23-m are configured to be on/off-controlled by control signals CKT1-1, CKT1-2, CKT2-1, and CKT2-2 which are commonly input to alternate columns in FIG. 1 (the transistors 13-1 to 13-m and 23-1 to 23-m will be referred to as "transfer switches" hereinafter).

The line memories 12-1 to 12-m and 22-1 to 22-m include capacitive elements to temporarily store pixel signals transferred from the pixels P11 to Pmn through the transfer switches 13-1 to 13-m and 23-1 to 23-m.

The transistors 11-1 to 11-m and 21-1 to 21-m function as horizontal selection switches to select the pixel signals stored in the line memories 12-1 to 12-m and 22-1 to 22-m. The transistors 11-1 to 11-m and 21-1 to 21-m are configured to be on/off-controlled by the output signals from the horizontal scanning circuits 10 and 20 (the transistors 11-1 to 11-m and 21-1 to 21-m will be referred to as "horizontal selection switches" hereinafter).

The solid-state image sensing apparatus also comprises an output channel CH1 to read out pixel signals through the horizontal selection switches 11-1 to 11-m and an output channel CH2 to read out pixel signals through the horizontal selection switches 21-1 to 21-m.

Characteristic operations of the solid-state image sensing apparatus according to the first embodiment having the above arrangement will be described below in detail with reference to the timing charts in FIGS. 2 and 3.

FIG. 2 is a timing chart showing the operation in the first driving mode. FIG. 3 is a timing chart showing the operation in the second driving mode.

Figure 3:
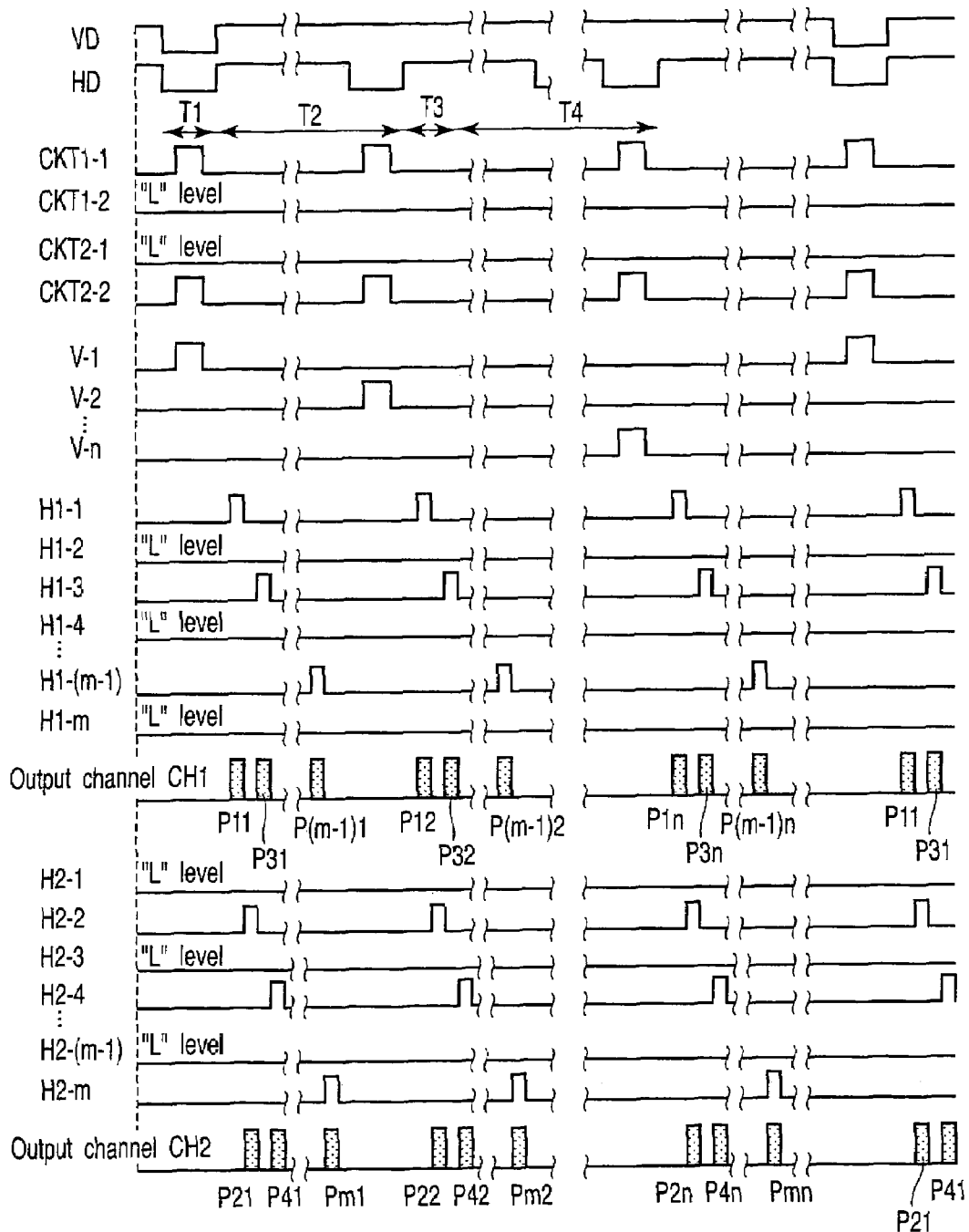
FIG. 3 is a timing chart showing the operation in the second driving mode by the solid-state image sensing element according to the first embodiment of the present invention.

The meanings of symbols used in FIGS. 2 and 3 will be defined prior to a description of the operations.

Referring to FIGS. 2 and 3, reference symbol VD denote a vertical sync signal; and HD, a horizontal sync signal. CKT1-1 denotes a transfer signal which on/off-controls the transfer switches 13-1, 13-3, . . . , 13-(m−1) of the odd-numbered columns. CKT1-2 denotes a transfer signal which on/off-controls the transfer switches 13-2, 13-4, . . . , 13-m of the even-numbered columns. CKT2-1 denotes a transfer signal which ON/OFF-controls the transfer switches 23-1, 23-3, . . . , 23-(m−1) of the odd-numbered columns. CKT2-2 denotes a transfer signal which on/off-controls the transfer switches 23-2, 23-4, . . . , 23-m of the even-numbered columns.

V-1 to V-n denote row selection signals output from the vertical scanning circuit 30. H1-1 to H1-m denote horizontal selection signals which are output from the units 10-1 to 10-m of the horizontal scanning circuit 10 to control the horizontal selection switches 11-1 to 11-m. H2-1 to H2-m denote horizontal selection signals which are output from the units 20-1 to 20-m of the horizontal scanning circuit 20 to control the horizontal selection switches 21-1 to 21-m. CH1 and CH2 also denote pixel signals output from the output channels.

The operation in the first driving mode will be described below in detail with reference to FIG. 2.

When the first driving mode is set, and the row selection signal V-1 changes to "H" level within a horizontal blanking period T1, the pixels P11 to Pm1 of the first row are selected. During this time, the transfer signals CKT1-1 and CKT1-2 are at "H" level, and the transfer signals CKT2-1 and CKT2-2 are at "L" level. For this reason, the pixel signals of the selected pixels P11 to Pm1 are stored in the line memories 12-1 to 12-m.

After that, only the horizontal scanning circuit 10 is operated within a horizontal valid period T2 to cause the units 10-1 to 10-m to sequentially output the horizontal selection signals H1-1 to H1-m. In synchronism with the outputs, the pixel signals of the pixels P11 to Pm1 of the first row, which are stored in the line memories 12-1 to 12-m, are sequentially output from the output channel CH1.

When the row selection signal V-2 changes to "H" level within a next horizontal blanking period T3, the pixels P12 to Pm2 of the second row are selected. During this time, the transfer signals CKT1-1 and CKT1-2 are at "H" level, and the transfer signals CKT2-1 and CKT2-2 are at "L" level. For this reason, the pixel signals of the selected pixels P12 to Pm2 are stored in the line memories 12-1 to 12-m. After that, only the horizontal scanning circuit 10 is operated within a horizontal valid period T4 to cause the units 10-1 to 10-m to sequentially output the horizontal selection signals H1-1 to H1-m. Then, the pixel signals of the pixels P12 to Pm2 of the second row, which are stored in the line memories 12-1 to 12-m, are sequentially output from the output channel CH1. From this time, in the same way as described above, the pixels of the third to nth rows are selected during horizontal blanking periods, and pixel signals of the rows are output from the output channel CH1 during horizontal valid periods.

As described above, when the first driving mode is set, the transfer signals CKT2-1 and CKT2-2 are always at "L" level so that the horizontal scanning circuit 20 does not operate. No pixel signals are output from the output channel CH2 while all pixel signals are read out from the output channel CH1.

The operation in the second driving mode will be described below in detail with reference to FIG. 3.

When the second driving mode is set, and the row selection signal V-1 changes to "H" level within the horizontal blanking period T1, the pixels P11 to Pm1 of the first row are selected.

During this time, the transfer signals CKT1-1 and CKT2-2 are at "H" level, and the transfer signals CKT1-2 and CKT2-1 are at "L" level. For this reason, of the selected pixels P11 to Pm1, the pixel signals of the pixels P11, P31, ..., P(m−1) 1 of the odd-numbered columns are stored in the odd-numbered line memories 12-1, 12-3, ..., 12-(m−1) of the line memories 12-1 to 12-m. The pixel signals of the pixels P21, P41, ..., Pm1 of the even-numbered columns are stored in the even-numbered line memories 22-2, 22-4, ..., 22-m of the line memories 22-1 to 22-m.

After that, the horizontal scanning circuits 10 and 20 are operated within the horizontal valid period T2.

In the horizontal scanning circuit 10, the horizontal selection signals H1-1, H1-3, ..., H1-(m−1) are sequentially output from only the odd-numbered horizontal scanning circuit units 10-1, 10-3, ..., 10-(m−1). In synchronism with the outputs, the pixel signals of the pixels P11, P31, ..., P(m−1)1, which are stored in the odd-numbered line memories 12-1, 12-3, ..., 12-(m−1), are sequentially output from the output channel CH1. On the other hand, in the horizontal scanning circuit 20, the horizontal selection signals H2-2, H2-4, ..., H2-m are sequentially output from only the even-numbered horizontal scanning circuit units 20-2, 20-4, ..., 20-m. In synchronism with the outputs, the pixel signals of the pixels P21, P41, ..., Pm1, which are stored in the even-numbered line memories 22-2, 22-4, ..., 22-m, are sequentially output from the output channel CH2.

When the row selection signal V-2 changes to "H" level within the next horizontal blanking period T3, the pixels P12 to Pm2 of the second row are selected.

During this time, the transfer signals CKT1-1 and CKT2-2 are at "H" level, and the transfer signals CKT1-2 and CKT2-1 are at "L" level. For this reason, of the selected pixels P12 to Pm2, the pixel signals of the pixels P12, P32, ..., P(m−1)2 of the odd-numbered columns are stored in the odd-numbered line memories 12-1, 12-3, ..., 12-(m−1) of the line memories 12-1 to 12-m. The pixel signals of the pixels P22, P42, ..., Pm2 of the even-numbered columns are stored in the even-numbered line memories 22-2, 22-4, ..., 22-m of the line memories 22-1 to 22-m.

After that, the horizontal scanning circuits 10 and 20 are operated within the horizontal valid period T4.

In the horizontal scanning circuit 10, the horizontal selection signals H1-1, H1-3, ..., H1-(m−1) are sequentially output from only the odd-numbered horizontal scanning circuit units 10-1, 10-3, ..., 10-(m−1). In synchronism with the outputs, the pixel signals of the pixels P12, P32, ..., P(m−1)2, which are stored in the odd-numbered line memories 12-1, 12-3, ..., 12-(m−1), are sequentially output from the output channel CH1.

In the horizontal scanning circuit 20, the horizontal selection signals H2-2, H2-4, ..., H2-m are sequentially output from only the even-numbered horizontal scanning circuit units 20-2, 20-4, ..., 20-m. In synchronism with the outputs, the pixel signals of the pixels P22, P42, ..., Pm2, which are stored in the even-numbered line memories 22-2, 22-4, ..., 22-m, are sequentially output from the output channel CH2.

From this time, in the same way as described above, the pixels of the third to nth rows are selected during horizontal blanking periods. Of the pixel signals, pixel signals of the odd-numbered columns are output from the output channel CH1, and pixel signals of the even-numbered columns are output from the output channel CH2 during horizontal valid periods.

The operation timing of the above-described horizontal scanning circuit 20 has a phase shift of 180° with respect to the operation timing of the horizontal scanning circuit 10. Hence, in mixing the pixel signals output from the output channels CH1 and CH2 later, the processing can be reliably executed. Scanning the horizontal scanning circuit units alternately can easily be implemented by employing, e.g., a decoder circuit. As a technique using a shift register as a horizontal scanning circuit, the present applicant previously filed an "interlaced scanning method" which is disclosed in Jpn. Pat. Appln. KOKAI Publication No. 6-350933.

As described above, when the second driving mode is set, the pixel signals of the odd-numbered columns are output from the output channel CH1, and the pixel signals of the even-numbered columns are output from the output channel CH2. For this reason, all pixel signals can be read out by using the two output channels CH1 and CH2. Hence, when the second driving mode is set, the horizontal valid period when the pixel signals are output to the output channels can be ½ that in the first driving mode. That is, the frame rate is higher than in the first driving mode.

Figure 4:
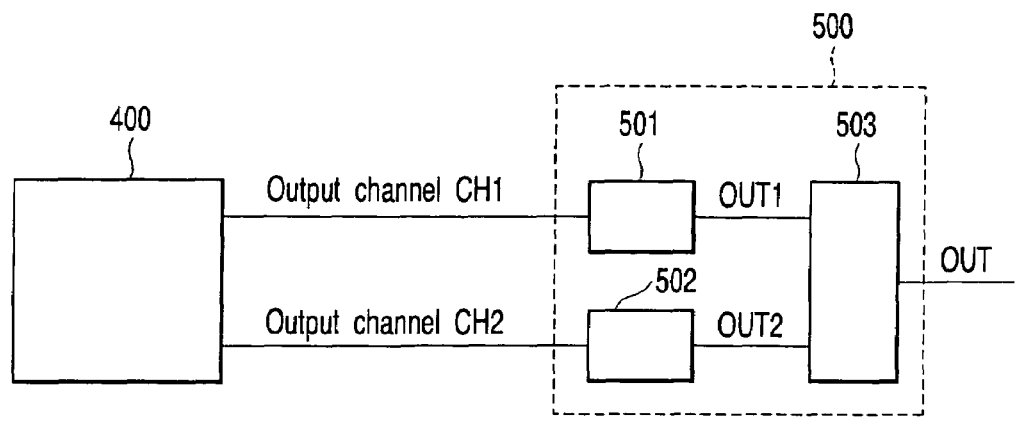
FIG. 4 is a block diagram showing the arrangement of a processing circuit which processes the output signal from the solid-state image sensing apparatus according to the first embodiment of the present invention.

FIG. 4 shows the arrangement of a circuit which processes the output signal from the solid-state image sensing apparatus (FIG. 1) according to the first embodiment.

As shown in FIG. 4, a processing circuit 500 mixes the signals from the output channels CH1 and CH2. The processing circuit 500 includes analog-to-digital conversion & latch circuits 501 and 502 and a selector 503.

A pixel signal from the output channel CH1 of a solid-state image sensing apparatus 400 is converted into digital image data and latched by the analog-to-digital conversion & latch circuit 501 and then output to the selector 503 (signal OUT1). On the other hand, a pixel signal from the output channel CH2 is converted into digital image data and latched by the analog-to-digital conversion & latch circuit 502 and then output to the selector 503 (signal OUT2). The selector 503 mixes the two pixel signals and outputs a signal (output signal OUT).

Figure 5:
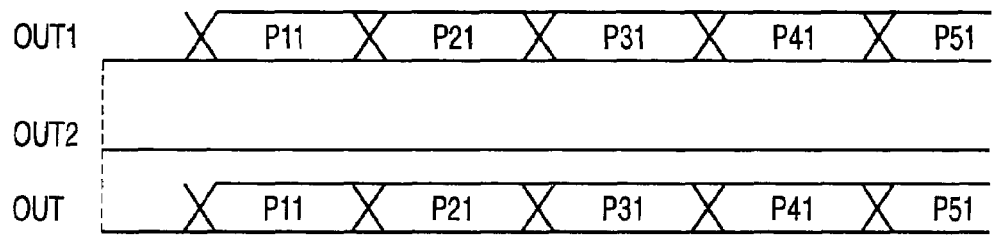
FIG. 5 is a view showing the relationship between signals OUT1 and OUT2 in a processing circuit 500 and an output signal OUT from the processing circuit 500 in the first driving mode.
Figure 6:
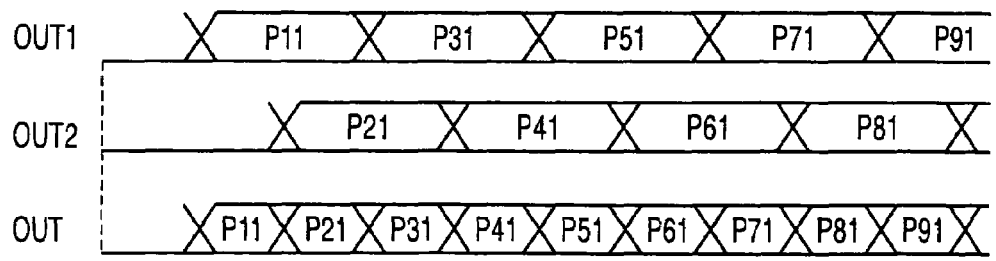
FIG. 6 is a view showing the relationship between the signals OUT1 and OUT2 in the processing circuit 500 and the output signal OUT from the processing circuit 500 in the second driving mode.

The signals OUT1 and OUT2 in the processing circuit 500 and the output signal OUT from the processing circuit 500 have a relationship shown in, e.g., FIG. 5 or 6. FIG. 5 corresponds to the first driving mode. FIG. 6 corresponds to the second driving mode.

As shown in FIG. 5, in the first driving mode, only the output channel CH1 is used. For this reason, the signal for the output channel CH1 is output from the processing circuit 500. On the other hand, as shown in FIG. 6, in the second driving mode, the signals from the output channels CH1 and CH2 are mixed and output from the processing circuit 500.

As described above with reference to FIG. 3, the phases of the output channels CH1 and CH2 have a shift of 180°. Hence, the signals can reliably be mixed by employing the above structure in which the output signals are digitized and latched by the analog-to-digital conversion & latch circuits 501 and 502 and selected by the selector 503.

As described above, in the first embodiment of the present invention, the solid-state image sensing apparatus having the arrangement shown in FIG. 1 is operated at the timings shown in FIGS. 2 and 3 so that the output channels CH1 and CH2 can be selected and switched. In addition, since pixel signals of pixels of odd- and even-numbered columns are output from the different output channels CH1 and CH2 while shifting their phases, the subsequent mixing processing can be reliably executed.

The circuit arrangement is not limited to that shown in FIG. 1. The reading circuit can have a function to cancel FPN of pixels. Even the arrangement of the mixing circuit is not limited to that shown in FIG. 4. The mixing circuit and solid-state image sensing apparatus can be formed on a single substrate.

Second Embodiment

FIG. 7 shows the arrangement of a solid-state image sensing apparatus according to a second embodiment of the present invention. This will be described in detail. To avoid any repetitive description, the same reference numerals as in the first embodiment (FIG. 1) denote the same constituent elements in FIG. 7, and different parts will mainly be described.

Referring to FIG. 7, horizontal selection switches 11-1 to 11-m and 21-1 to 21-m to select pixel signals stored in line memories 12-1 to 12-m and 22-1 to 22-m are arranged in output signal lines 50-1 to 50-m, as in the first embodiment. In the second embodiment, the horizontal selection switches 11-1 to 11-m are configured to be on/off-controlled by twos such that a pair of two switches 11-1 and 11-2, 11-3 and 11-4, ..., or 11-(m−1) and 11-m are on/off-controlled by the same horizontal selection signal. Similarly, the horizontal selection switches 21-1 to 21-m are also configured to be on/off-controlled by twos such that a pair of two switches 21-1 and 21-2, 21-3 and 21-4, ..., or 21-(m−1) and 21-m are on/off-controlled by the same horizontal selection signal.

The solid-state image sensing apparatus also comprises output channels CH1, CH2, CH3, and CH4. The output channel CH1 reads out pixel signals through the odd-numbered selection switches 11-1, 11-3, ..., 11-(m−1) of the horizontal selection switches 11-1 to 11-m. The output channel CH2 reads out pixel signals through the even-numbered selection switches 11-2, 11-4, ..., 11-m. The output channel CH3 reads out pixel signals through the odd-numbered selection switches 21-1, 21-3, ..., 21-(m−1) of the horizontal selection switches 21-1 to 21-m. The output channel CH4 reads out pixel signals through the even-numbered selection switches 21-2, 21-4, ..., 21-m.

Horizontal scanning circuits 10 and 20 include units 10-1 to 10-(m/2) and units 20-1 to 20-(m/2) in half the number of horizontal pixels to control the horizontal selection switches 11-1 to 11-m and 21-1 to 21-m by twos, as described above.

Figure 8:
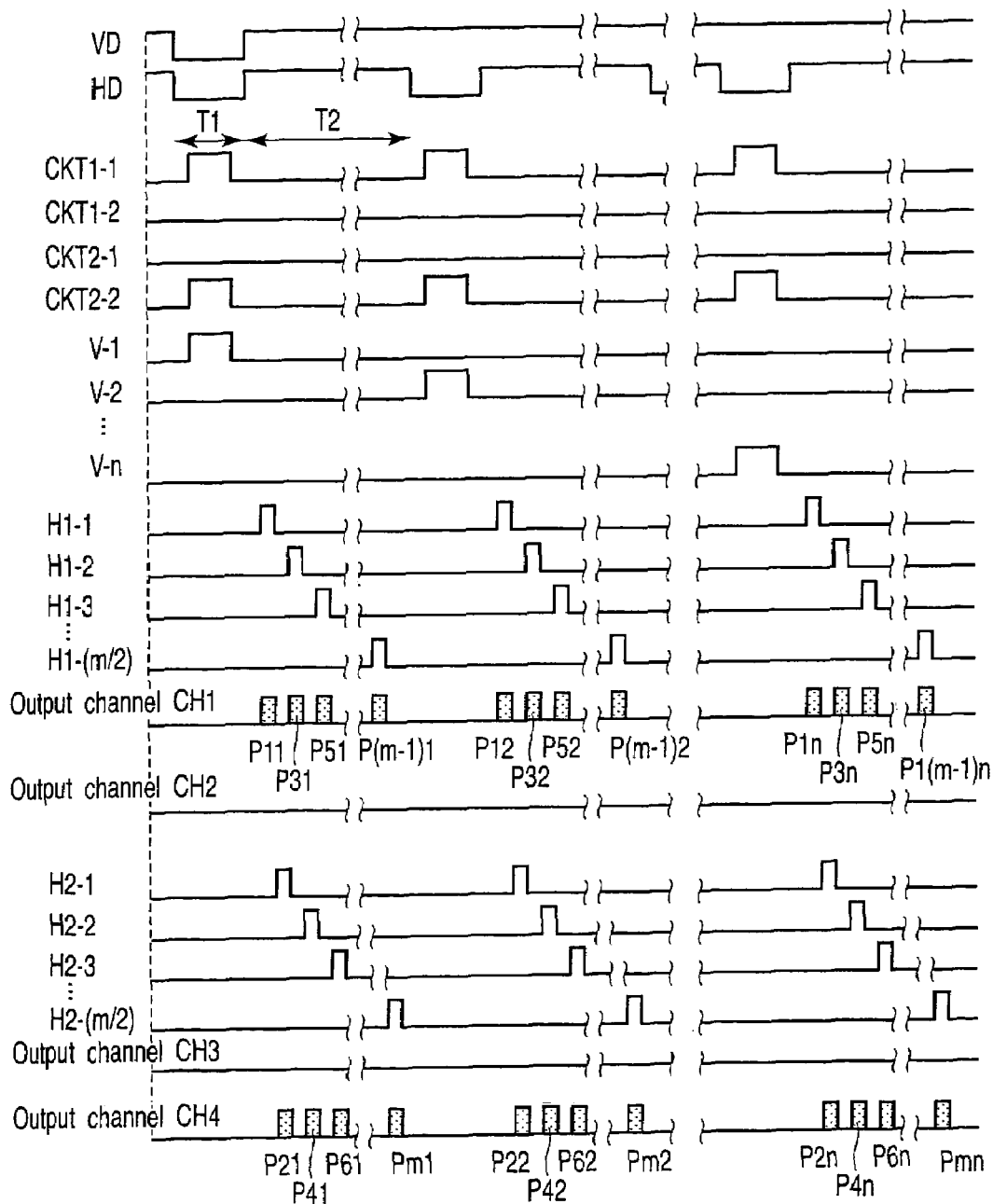
FIG. 8 is a timing chart showing the operation in the first driving mode by a solid-state image sensing element according to the second embodiment of the present invention.
Figure 9:
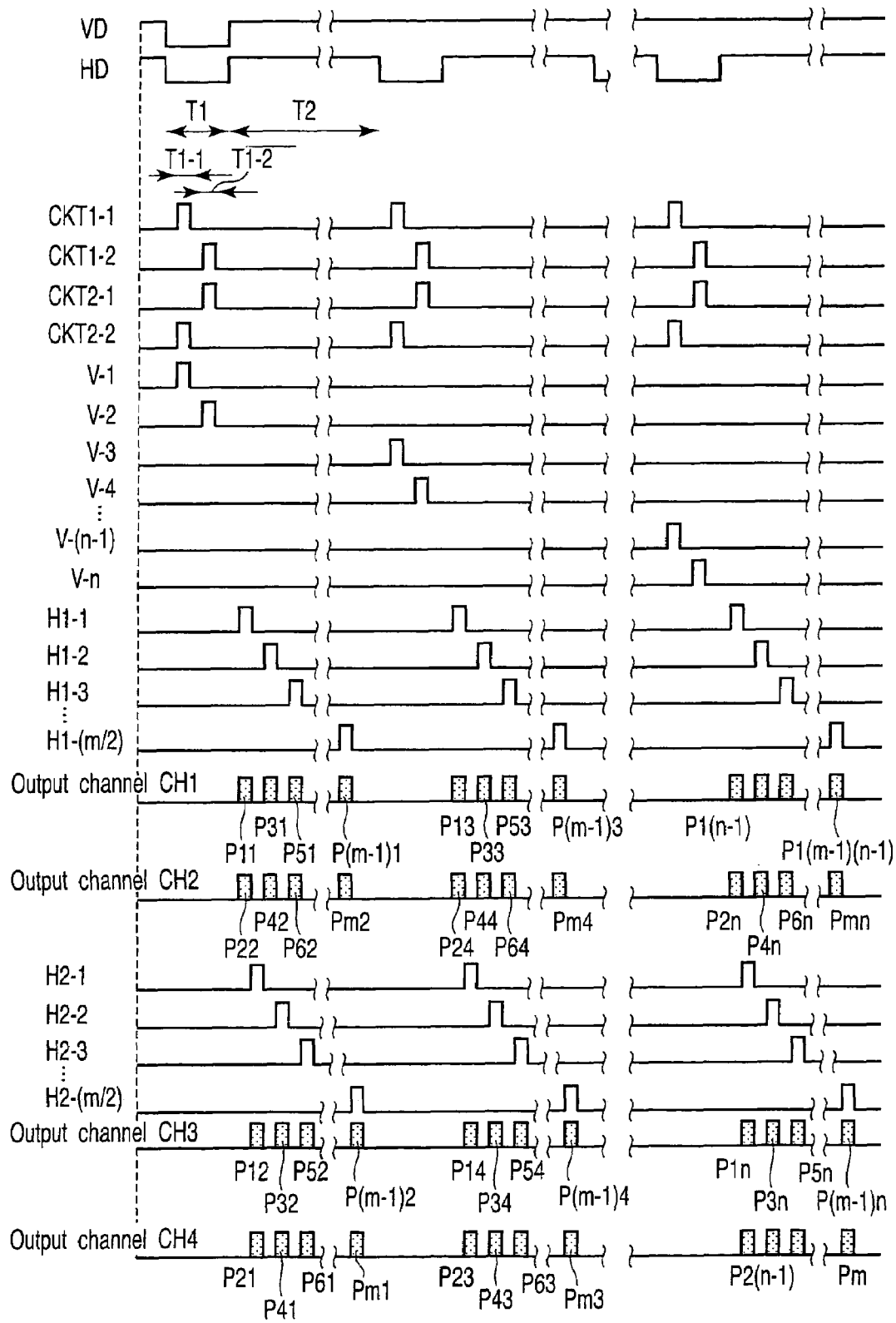
FIG. 9 is a timing chart showing the operation in the second driving mode (A) by the solid-state image sensing element according to the second embodiment of the present invention.
Figure 10:
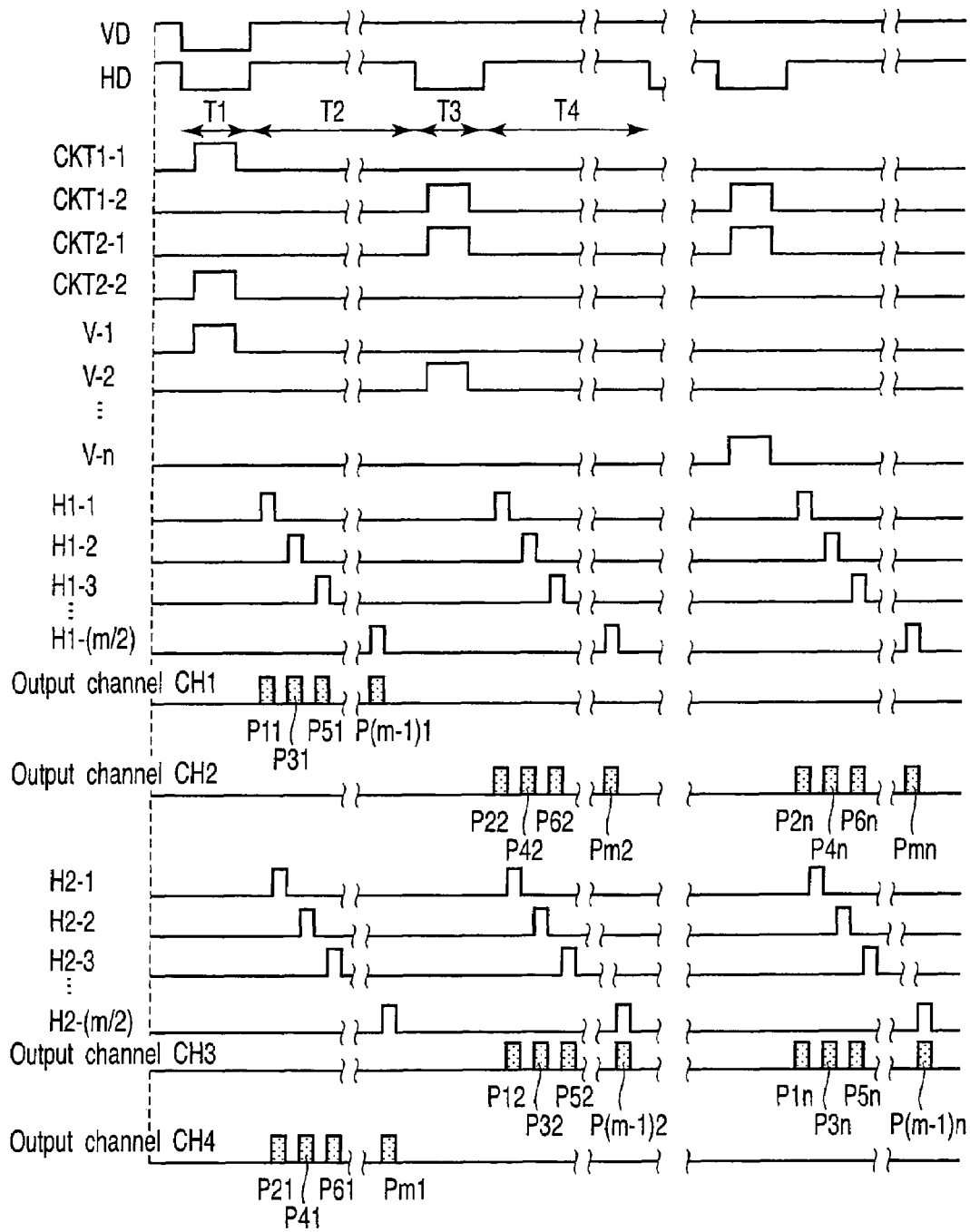
FIG. 10 is a timing chart showing the operation in the second driving mode (B) by the solid-state image sensing element according to the second embodiment of the present invention.

Characteristic operations of the solid-state image sensing apparatus according to the second embodiment having the above arrangement will be described below in detail with reference to the timing charts in FIGS. 8 to 10. FIG. 8 is a timing chart showing the operation in the first driving mode. FIGS. 9 and 10 are timing charts showing the operations in the second driving modes (A) and (B)

The meanings of symbols used in FIGS. 8 to 10 will be defined prior to the description of the operations.

H1-1 to H1-(m/2) denote horizontal selection signals which are output from the units 10-1 to 10-(m/2) of the horizontal scanning circuit 10 to control the horizontal selection switches 11-1 to 11-m. H2-1 to H2-(m/2) denote horizontal selection signals which are output from the units 20-1 to 20-(m/2) of the horizontal scanning circuit 20 to control the horizontal selection switches 21-1 to 21-m. CH1 to CH4 also denote pixel signals output from the output channels. The meanings of the remaining symbols are the same as in the first embodiment, and repetitive description thereof will be omitted.

The operation in the first driving mode will be described below in detail with reference to FIG. 8.

When the first driving mode is set, and a row selection signal V-1 changes to "H" level within a horizontal blanking period T1, pixels P11 to Pm1 of the first row are selected. During this time, transfer signals CKT1-1 and CKT2-2 are at "H" level, and transfer signals CKT1-2 and CKT2-1 are at "L" level. For this reason, of the selected pixels P11 to Pm1, the pixel signals of the pixels P11, P31, ..., P(m−1)1 of the odd-numbered columns are stored in the odd-numbered line memories 12-1, 12-3, ..., 12-(m−1) of the line memories 12-1 to 12-m. The pixel signals of the pixels P21, P41, ..., Pm1 of the even-numbered columns are stored in the even-numbered line memories 22-2, 22-4, ..., 22-m of the line memories 22-1 to 22-m.

After that, the horizontal scanning circuits 10 and 20 are operated within a horizontal valid period T2.

The units 10-1 to 10-(m/2) of the horizontal scanning circuit 10 sequentially output the horizontal selection signals H1-1 to H1-(m/2). The pixel signals of the pixels P11, P31, ..., P(m−1)1, which are stored in the odd-numbered line memories 12-1, 12-3, ..., 12-(m−1), are sequentially output from the output channel CH1.

On the other hand, the units 20-1 to 20-(m/2) of the horizontal scanning circuit 20 sequentially output the horizontal selection signals H2-1 to H2-(m/2). The pixel signals of the pixels P21, P41, ..., Pm1, which are stored in the even-numbered line memories 22-2, 22-4, ..., 22-m, are sequentially output from the output channel CH4.

From this time, in the same way as described above, the pixels of the second to nth rows are selected during horizontal blanking periods. Of the pixel signals, pixel signals of the odd-numbered columns are output from the output channel CH1, and pixel signals of the even-numbered columns are output from the output channel CH4 during horizontal valid periods. That is, in the first driving mode, signals of two pixels adjacent in the horizontal direction are read out in parallel from the two output channels.

The operation timing of the horizontal scanning circuit 20 has a phase shift of 180° with respect to the operation timing of the horizontal scanning circuit 10. Hence, as in the above-described first embodiment, in mixing the signals from the output channels CH1 and CH4 later, the processing can be reliably executed.

The operation in the second driving mode (A) will be described below in detail with reference to FIG. 9.

When the second driving mode (A) is set, and the row selection signal V-1 changes to "H" level in a first half period T1-1 within the horizontal blanking period T1, the pixels P11 to Pm1 of the first row are selected.

During this time, the transfer signals CKT1-1 and CKT2-2 are at "H" level, and the transfer signals CKT1-2 and CKT2-1 are at "L" level. For this reason, of the selected pixels P11 to Pm1, the pixel signals of the pixels P11, P31, ..., P(m−1)1 of the odd-numbered columns are stored in the odd-numbered line memories 12-1, 12-3, ..., 12-(m−1) of the line memories 12-1 to 12-m. The pixel signals of the pixels P21, P41, ..., Pm1 of the even-numbered columns are stored in the even-numbered line memories 22-2, 22-4, ..., 22-m of the line memories 22-1 to 22-m.

When a row selection signal V-2 changes to "H" level in a second half period T1-2, the pixels P12 to Pm2 of the second row are selected.

During this time, the transfer signals CKT1-2 and CKT2-1 are at "H" level, and the transfer signals CKT1-1 and CKT2-2 are at "L" level. For this reason, of the selected pixels P12 to Pm2, the pixel signals of the pixels P12, P32, . . . , P(m−1)2 of the odd-numbered columns are stored in the odd-numbered line memories 22-1, 22-3, . . . , 22-(m−1) of the line memories 22-1 to 22-m. The pixel signals of the pixels P22, P42, . . . , Pm2 of the even-numbered columns are stored in the even-numbered line memories 12-2, 12-4, . . . , 12-m of the line memories 12-1 to 12-m.

After that, the horizontal scanning circuits 10 and 20 are operated within the horizontal valid period T2.

The horizontal scanning circuit units 10-1 to 10-(m/2) sequentially output the horizontal selection signals H1-1 to H1-(m/2). The pixel signals of the pixels P11, P31, . . . , P(m−1)1, which are stored in the odd-numbered line memories 12-1, 12-3, . . . , 12-(m−1) of the line memories 12-1 to 12-m, are sequentially output from the output channel CH1. The pixel signals of the pixels P22, P42, . . . , Pm2, which are stored in the even-numbered line memories 12-2, 12-4, . . . , 12-m, are sequentially output from the output channel CH2. On the other hand, the horizontal scanning circuit units 20-1 to 20-(m/2) sequentially output the horizontal selection signals H2-1 to H2-(m/2). The pixel signals of the pixels P12, P32, . . . , P(m−1)2, which are stored in the odd-numbered line memories 22-1, 22-3, . . . , 22-(m−1) of the line memories 22-1 to 22-m, are sequentially output from the output channel CH3. The pixel signals of the pixels P21, P41, . . . , Pm1, which are stored in the even-numbered line memories 22-2, 22-4, . . . , 22-m, are sequentially output from the output channel CH4.

From this time, in the same way as described above, every two pixels of the third to nth rows are selected during horizontal blanking periods. Of the pixel signals, pixel signals of the odd-numbered rows and odd-numbered columns are output to the output channel CH1 during horizontal valid periods. Pixel signals of the odd-numbered rows and even-numbered columns are output to the output channel CH4. Pixel signals of the even-numbered rows and odd-numbered columns are output to the output channel CH3. Pixel signals of the even-numbered rows and even-numbered columns are output to the output channel CH2. That is, in the second driving mode (A) shown in FIG. 9, signals of 2×2 pixels adjacent in the horizontal and vertical directions are read out in parallel from the four output channels.

In a color element having a "Bayer matrix", green (G) color filters are arranged in a checkered pattern on alternate pixels in the horizontal and vertical directions. Red (R) and blue (B) filters are line-sequentially alternately arranged at the remaining pixel positions of the respective rows in the horizontal direction. In such an element, the second driving mode (A) means that the output channels are selectively used for the respective colors. Hence, the post-processing can be easily executed.

In the second driving mode (A), since the pixel signals of pixels of every two rows are output, the frame rate is higher than in the first driving mode.

Even in this case, the operation timing of the horizontal scanning circuit 20 has a phase shift of 180° with respect to the operation timing of the horizontal scanning circuit 10. Hence, as in the above-described first embodiment, in mixing later the signals from the output channels CH1 and CH4 which output the pixel signals of the pixels of the first row, and the signals from the output channels CH3 and CH2 which output the pixel signals of the pixels of the second row, the processing can be reliably executed.

The operation in the second driving mode (B) will be described below in detail with reference to FIG. 10.

When the second driving mode (B) is set, and the row selection signal V-1 changes to "H" level within the horizontal blanking period T1, the pixels P11 to Pm1 of the first row are selected. During this time, the transfer signals CKT1-1 and CKT2-2 are at "H" level, and the transfer signals CKT1-2 and CKT2-1 are at "L" level. For this reason, of the selected pixels P11 to Pm1, the pixel signals of the pixels P11, P31, . . . , P(m−1)1 of the odd-numbered columns are stored in the odd-numbered line memories 12-1, 12-3, . . . , 12-(m−1) of the line memories 12-1 to 12-m. The pixel signals of the pixels P21, P41, . . . , Pm1 of the even-numbered columns are stored in the even-numbered line memories 22-2, 22-4, . . . , 22-m of the line memories 22-1 to 22-m.

After that, the horizontal scanning circuits 10 and 20 are operated within the horizontal valid period T2.

The horizontal scanning circuit units 10-1 to 10-(m/2) sequentially output the horizontal selection signals H1-1 to H1-(m/2). The signals of the pixels P11, P31, . . . , P(m−1)1, which are stored in the odd-numbered line memories 12-1, 12-3, . . . , 12-(m−1), are sequentially output from the output channel CH1.

On the other hand, the horizontal scanning circuit units 20-1 to 20-(m/2) sequentially output the horizontal selection signals H2-1 to H2-(m/2). The pixel signals of the pixels P21, P41, . . . , Pm1, which are stored in the even-numbered line memories 22-2, 22-4, . . . , 22-m, are sequentially output from the output channel CH4. The operation timing of the horizontal scanning circuit 20 has a phase shift of 180° with respect to the operation timing of the horizontal scanning circuit 10. Hence, as in the first embodiment, in mixing the signals from the output channels CH1 and CH4 later, the processing can be reliably executed.

When the row selection signal V-2 changes to "H" level within a next horizontal blanking period T3, the pixels P12 to Pm2 of the second row are selected.

During this time, the transfer signals CKT1-2 and CKT2-1 are at "H" level, and the transfer signals CKT1-1 and CKT2-2 are at "L" level. For this reason, of the selected pixels P12 to Pm2, the pixel signals of the pixels P12, P32, . . . , P(m−1)2 of the odd-numbered columns are stored in the odd-numbered line memories 22-1, 22-3, . . . , 22-(m−1) of the line memories 22-1 to 22-m. The pixel signals of the pixels P22, P42, . . . , Pm2 of the even-numbered columns are stored in the even-numbered line memories 12-2, 12-4, . . . , 12-m of the line memories 12-1 to 12-m.

After that, the horizontal scanning circuits 10 and 20 are operated within a horizontal valid period T4.

The horizontal scanning circuit units 10-1 to 10-(m/2) sequentially output the horizontal selection signals H1-1 to H1-(m/2). The pixel signals of the pixels P22, P42, . . . , Pm2, which are stored in the even-numbered line memories 12-2, 12-4, . . . , 12-m, are sequentially output from the output channel CH2. On the other hand, the horizontal scanning circuit units 20-1 to 20-(m/2) sequentially output the horizontal selection signals H2-1 to H2-(m/2). The pixel signals of the pixels P12, P32, . . . , P(m−1)2, which are stored in the odd-numbered line memories 22-1, 22-3, . . . , 22-(m−1), are sequentially output from the output channel CH3. Even in this case, the operation timing of the horizontal scanning circuit 20 has a phase shift of 180° with respect to the operation timing of the horizontal scanning circuit 10.

From this time, in the same way as described above, pixels of the third to nth rows are selected during horizontal blanking periods. Of the pixel signals, pixel signals of the odd-numbered rows and odd-numbered columns are output to the output channel CH1 during horizontal valid periods. Pixel signals of the odd-numbered rows and even-numbered columns are output to the output channel CH4. Pixel signals of the even-numbered rows and odd-numbered columns are output to the output channel CH3. Pixel signals of the even-numbered rows and even-numbered columns are output to the output channel CH2.

That is, in the second driving mode (B), signals of 2×2 pixels adjacent in the horizontal and vertical directions are read out in parallel from the four output channels CH1 to CH4, as in the second driving mode (A). The frame rate in the second driving mode (B) is the same as in the first driving mode. That is, the frame rate is lower than in the second driving mode (A). However, as in the second driving mode (A), since the output channels are selectively used for the respective colors in a color element having a Bayer matrix, the post-processing can be easily executed.

As described above, in the second embodiment of the present invention, the solid-state image sensing apparatus having the arrangement shown in FIG. 7 is operated at the timings shown in FIGS. 8 to 10 so that the output channels CH1 and CH2 can be selected and switched. In addition, since pixel signals of pixels of odd- and even-numbered columns are output from the different output channels CH1 to CH4 while shifting their phases, the subsequent mixing processing can reliably be executed. The circuit arrangement is not limited to that shown in FIG. 7. The reading circuit can have a function to cancel FPN of pixels.

The embodiments of the present invention have been described above. However, the present invention is not limited to those embodiments, and various changes and modifications can be made within the spirit and scope of the present invention. For example, the solid-state image sensing apparatus according to each embodiment and the reading method thereof can also be applied to an apparatus in which gray filters are formed on specific pixels in an array of filters of three primary colors (R, G, and B). Even in this case, since the output channels are selectively used for the respective colors, the post-processing can be easily executed.

As has been described above in detail, according to the present invention, a solid-state image sensing apparatus which has a plurality of output channels to parallelly output image data so that a high-speed pixel read can be executed, and a reading method thereof can be provided.

Additional advantages and modifications will readily occur to those skilled in the art. Therefore, the invention in its broader aspects is not limited to the specific details, representative devices, and illustrated examples shown and described herein. Accordingly, various modifications may be made without departing from the spirit or scope of the general inventive concept as defined by the appended claims and their equivalents.

What is claimed is:

1. A solid-state image sensing apparatus comprising:
   an image sensing area in which a plurality of pixels are two-dimensionally arrayed;
   a plurality of output channels;
   a first driving mode in which pixel signals of pixels in the image sensing area are read out, wherein the read-out pixel signals are output to at least one output channel selected from among the plurality of output channels;
   a second driving mode in which pixel signals of odd-numbered columns and pixel signals of even-numbered columns arrayed in the same row in the image sensing area are read-out, wherein the readout pixel signals are output to a plurality of output channels selected from among the output channels, and wherein the read-out pixel signals of odd-numbered columns and the read-out pixel signals of even-numbered columns are output to different ones of the selected output channels so as to have different phases;
   line memories which are arranged between the pixels and the output channels and which temporarily store pixel signals of the pixels selected and read out in the first driving mode and the second driving mode; and
   a control circuit which is arranged between the pixels and the line memories and which sets a driving mode to one of the first driving mode and the second driving mode based on an externally input signal which is set,
   wherein the number of output channels to which the pixel signals are output in the first driving mode and the number of output channels to which the pixel signals are output in the second driving mode are different.

2. The solid-state image sensing apparatus according to claim 1,
   wherein the control circuit is a transfer switch in which a common control signal is input in every other column.

3. The solid-state image sensing apparatus according to claim 1, wherein the phase shift between the pixel signals of the odd-numbered columns and the pixel signals of the even-numbered columns is 180 degrees.

4. The solid-state image sensing apparatus according to claim 1,
   wherein the image sensing area is provided with a color filter in Bayer matrix corresponding to the pixels, and
   in the second driving mode, pixel signals of pixels in the same color phase among color phase codings defined by the color filters are output from the same output channels.

5. The solid-state image sensing apparatus according to claim 1, wherein in the first and second driving modes, there is a channel which can be used in common.

6. The solid-state image sensing apparatus according to claim 1, wherein in both the first and second driving modes, pixel signals of pixels from m×n pieces in the image sensing area are output wherein m and n are integers.

7. The solid-state image sensing apparatus according to claim 1, wherein the line memories are capacitive elements arranged in every column.

* * * * *